United States Patent
Barreiro Rodriguez et al.

(10) Patent No.: US 11,014,687 B2
(45) Date of Patent: May 25, 2021

(54) AIRCRAFT TAILCONE INCORPORATING AN APU ANNULAR AIR INTAKE

(71) Applicant: AIRBUS OPERATIONS SL, Getafe (ES)

(72) Inventors: Victor Barreiro Rodriguez, Getafe (ES); Pio Fernandez-Lopez, Getafe (ES); Marcos Javier Chiabrando, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 245 days.

(21) Appl. No.: 16/117,746

(22) Filed: Aug. 30, 2018

(65) Prior Publication Data

US 2019/0127077 A1   May 2, 2019

(30) Foreign Application Priority Data

Oct. 30, 2017 (EP) .................................. 17382726

(51) Int. Cl.
*B64D 41/00* (2006.01)
*B64C 1/16* (2006.01)
*B64D 33/02* (2006.01)

(52) U.S. Cl.
CPC .............. *B64D 41/007* (2013.01); *B64C 1/16* (2013.01); *B64D 33/02* (2013.01); *B64D 2033/0213* (2013.01); *B64D 2041/002* (2013.01)

(58) Field of Classification Search
CPC ............ B64D 33/02; B64D 2033/0213; B64D 2041/002; B64D 41/007; B64C 1/16
USPC ......................................................... 244/55
See application file for complete search history.

(56) References Cited

U.S. PATENT DOCUMENTS

| | | | | |
|---|---|---|---|---|
| 3,386,658 A | * | 6/1968 | Mehr ................... | F02K 1/1269 239/127.3 |
| 4,418,879 A | * | 12/1983 | Vanderleest .......... | B64D 33/02 137/15.1 |
| 5,000,399 A | * | 3/1991 | Readnour .............. | B64D 33/02 244/130 |
| 5,655,359 A | * | 8/1997 | Campbell .............. | B64D 33/02 244/58 |
| 6,092,360 A | * | 7/2000 | Hoag ..................... | B64D 33/08 244/58 |
| 6,264,137 B1 | * | 7/2001 | Sheoran ................. | B64D 33/02 244/53 B |
| 6,651,929 B2 | * | 11/2003 | Dionne .................. | B64D 33/08 244/57 |

(Continued)

OTHER PUBLICATIONS

European Search Report; priority document.

*Primary Examiner* — Richard R. Green
*Assistant Examiner* — Brady W Frazier
(74) *Attorney, Agent, or Firm* — Greer, Burns & Crain, Ltd.

(57) ABSTRACT

An aircraft tailcone comprising a tailcone fuselage, a turbomachine, for example an APU, housed inside the tailcone, a ram air intake on the tailcone fuselage for the ingestion of ram air towards the interior of the turbomachine compartment, an inlet flap operable reciprocately from an open position in which ingestion of ram air is allowed, and a closed position in which ram air ingestion is prevented. The ram air intake extends annularly along a perimeter of the tailcone fuselage, and the inlet flap is configured such in its closed position that a surface of the inlet flap is substantially flush with the tailcone fuselage.

7 Claims, 3 Drawing Sheets

(56) References Cited

U.S. PATENT DOCUMENTS

| | | | | |
|---|---|---|---|---|
| 6,901,737 B2* | 6/2005 | Schnoor | ............... | B64D 33/02 244/53 B |
| 7,040,576 B2* | 5/2006 | Noiseux | ............... | A62C 2/14 244/129.2 |
| 7,093,666 B2* | 8/2006 | Trumper | ............... | B64D 25/00 169/48 |
| 7,600,714 B2* | 10/2009 | Sheoran | ............... | B64D 41/00 244/53 B |
| 8,141,818 B2* | 3/2012 | Bouldin | ............... | B64D 41/00 244/53 B |
| 9,145,214 B2* | 9/2015 | Payangapadan | ...... | B64C 1/0009 |
| 9,194,293 B2* | 11/2015 | Napier | ............... | F02C 7/045 |
| 9,254,924 B2* | 2/2016 | Nager | ............... | B64D 41/00 |
| 9,409,653 B2* | 8/2016 | Ahmad | ............... | B64D 41/00 |
| 2005/0224635 A1* | 10/2005 | Hein | ............... | B64D 41/00 244/10 |
| 2006/0163425 A1* | 7/2006 | Brown | ............... | B64D 41/00 244/53 B |
| 2007/0193277 A1* | 8/2007 | Sheoran | ............... | F02C 7/32 60/802 |
| 2009/0152406 A1* | 6/2009 | Francisco | ............... | F02C 7/32 244/53 B |
| 2009/0272847 A1* | 11/2009 | Robbins | ............... | B64D 33/02 244/129.5 |
| 2016/0040595 A1* | 2/2016 | Devine | ............... | F02K 3/077 415/2.1 |
| 2016/0177724 A1* | 6/2016 | Sheoran | ............... | B64D 33/00 415/121.2 |

\* cited by examiner

AIRCRAFT TAILCONE INCORPORATING AN APU ANNULAR AIR INTAKE

CROSS-REFERENCES TO RELATED APPLICATIONS

This application claims the benefit of the European patent application No. 17382726.2 filed on Oct. 30, 2017, the entire disclosures of which are incorporated herein by way of reference.

BACKGROUND OF THE INVENTION

The present invention refers in general to aircraft incorporating a turbomachine, for example an Auxiliary Power Unit (APU), installed at the aircraft tailcone (rear end).

An object of the invention is to improve the aerodynamics of the tailcone fuselage boundary layer ingestion, as well as the aerodynamics of the APU or /turbomachine air intake, in order to reduce the drag created by its installation on the rear fuselage and improve pressure recovery on the APU or turbomachine inlet.

Modern commercial aircraft incorporate an Auxiliary Power Unit (APU), which is mainly a turbomachine, installed at the aircraft tailcone (FIG. 1) and housed within an APU compartment. This turbomachine comprises a turbine, a pneumatic compressor, and/or a hydraulic pump, a gearbox and one or several electric generators, in order to provide electric, pneumatic or hydraulic power, or a combination thereof to the aircraft.

For the turbomachine operation, an air intake is conventionally provided either at the bottom or top of its designed compartment. Current turbomachine air intake installations consist of an individual opening that extend on a reduced area of the tail cone fuselage, and an inlet flap that opens and close that opening.

FIG. 2 (FIG. 1 of the European patent publication EP-3025965 A1) shows a conventional aircraft tailcone (1) incorporating a turbomachine (in this example case, an APU) air intake (6) and an inlet flap (7) protruding outside the tail cone fuselage (2), thereby creating a significant drag. Conventionally, APU air intakes are designed with the sole purpose of providing a ram air intake for the APU operation, but they have never been designed to improve aircraft aerodynamics, that is, the aerodynamics of ram air ingestion of the boundary layer at the rear of the aircraft, has never been investigated.

SUMMARY OF THE INVENTION

The present invention solves the above-described drawbacks of conventional installation of the air intake for turbomachines located at the rear end of the aircraft, by providing an aircraft tailcone incorporating an air intake extending annularly on a perimeter of the tailcone fuselage. The air intake extends partially around or on an entire perimeter of the tailcone fuselage, hence it might be regarded as an annular air intake or alternatively it might be defined as a circumferential air intake. Preferably, the air intake extends on an entire perimeter of the tailcone fuselage in order to maximize the area for the air ingestion and for a better distribution of the ingested air at the turbomachine compartment.

An aspect of the invention refers to an aircraft tailcone comprising a tailcone fuselage, a turbomachine compartment inside the tailcone fuselage, a turbomachine housed inside its compartment, and a ram air intake in the tailcone fuselage for the ingestion of ram air towards the interior of the turbomachine compartment. Preferably, the turbomachine is an Auxiliary Power Unit (APU).

According to the invention the ram air intake extends annularly along at least part of a perimeter of the tailcone fuselage. Preferably, the aircraft tailcone further comprises at least one inlet flap operable reciprocately from an open position in which ingestion of ram air is allowed through the air intake, and a closed position in which ram air ingestion is prevented.

The inlet flap is configured such as in its open position the inlet flap is located at least partially inside the tailcone fuselage, and in its closed position, a surface of the inlet flap is substantially flush (that is, at the same level or continuous) with the tailcone fuselage surface, so that the inlet flap never protrudes outside the tailcone fuselage and no drag is generated due to the air intake.

Therefore, the present invention involves two aspects:
An alternative ingestion path for the boundary layer in order to improve aerodynamically the tail cone and reduce aircraft drag, and
A turbomachine air intake with a reduced drag compared with the traditional designs.

BRIEF DESCRIPTION OF THE DRAWINGS

Preferred embodiments of the invention, are henceforth described with reference to the accompanying drawings, wherein.

DETAILED DESCRIPTION OF THE PREFERRED EMBODIMENTS

Figure 1:
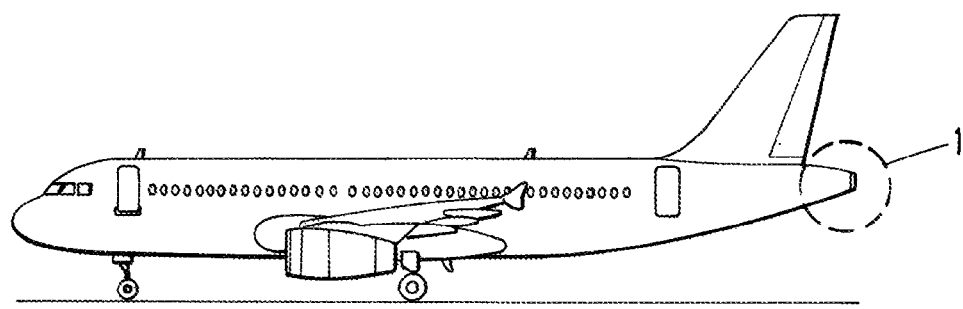
FIG. 1 shows a side elevational view of a commercial aircraft of the prior art, wherein the location of the tailcone is identified.
Figure 2:
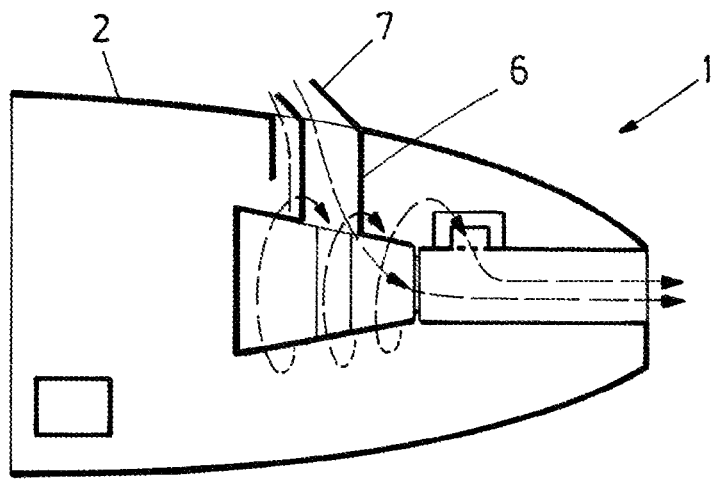
FIG. 2 shows a schematic representation in a side elevational view of an APU compartment according to the prior art.
Figure 3:
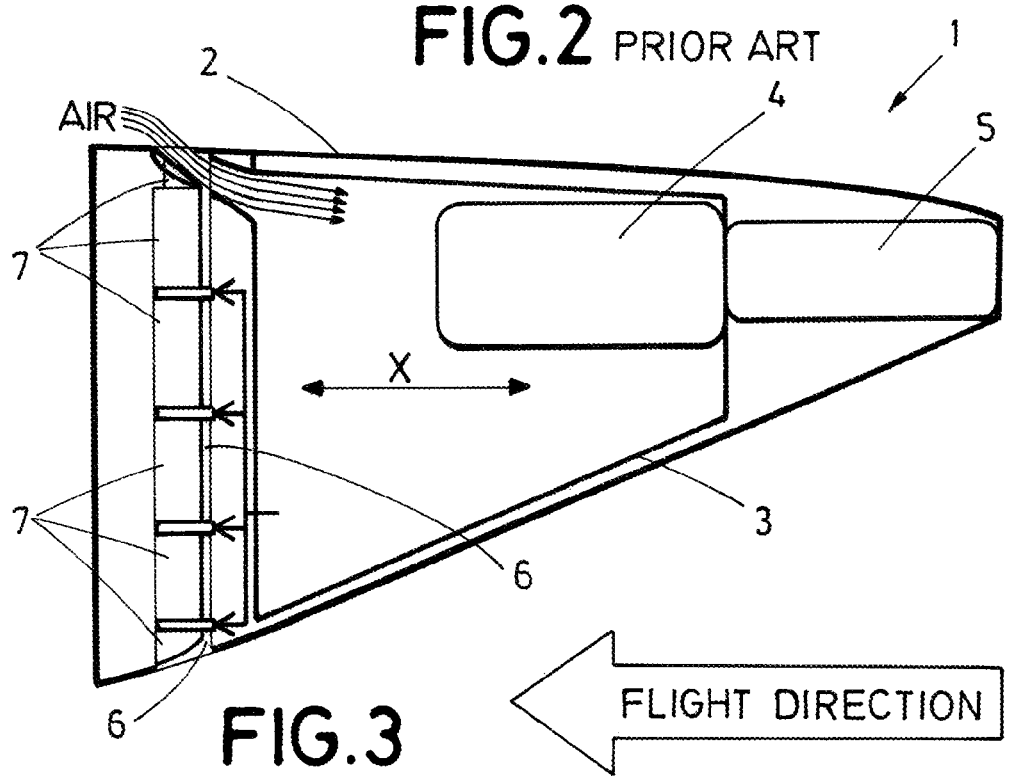
FIG. 3 shows a schematic representation in a side elevational view of an aircraft tailcone according to the invention. The arrows illustrate the ram air ingestion towards the turbomachine compartment.

FIG. 3 shows an aircraft tailcone (1) comprising a tailcone fuselage (2), and a turbomachine compartment (3) inside the tailcone fuselage (1). A turbomachine (4) is housed inside the turbomachine compartment (3) such as the combustion gases are discharged to the outside through an exhaust (5).

Figure 5:
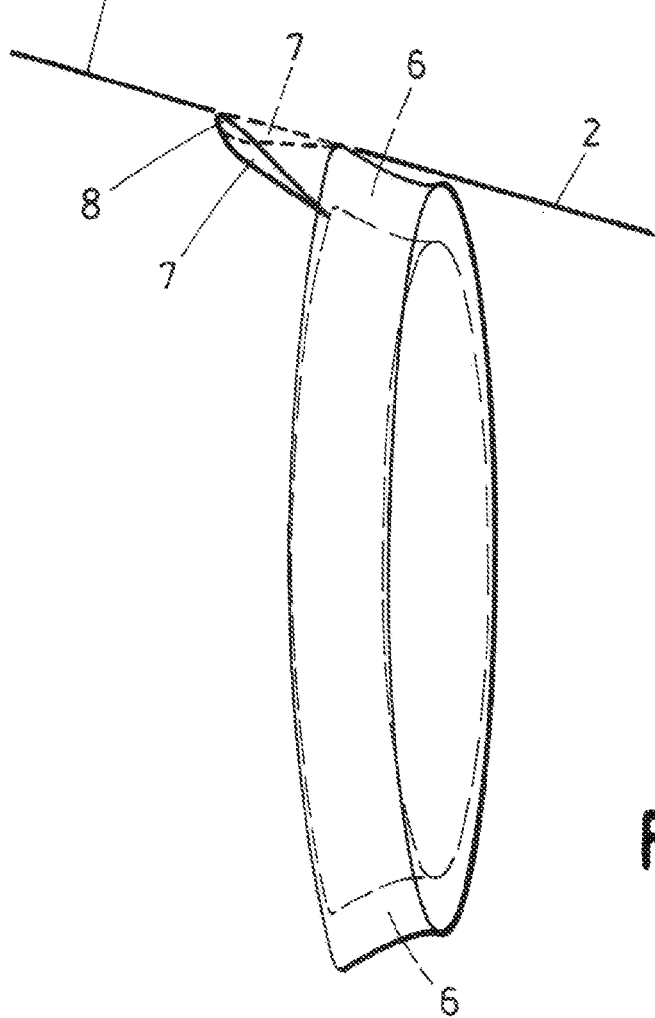
FIG. 5 shows a schematic representation in a perspective view, of an annular air intake duct according to the invention. The open and closed position of an inlet flap is represented in the figure, wherein the closed position is shown in broken lines and the open position of the inlet flap is represented in continuous line.

The tailcone (1) incorporates an annular air intake (6) that in this preferred embodiment extends annularly along an entire perimeter of the tailcone fuselage (2) as shown in FIGS. 3 and 5. The perimeter is to be understood as to be laying on a plane transversal to the longitudinal axis (X) of the tailcone (1).

Furthermore, the aircraft tailcone (1) comprises a plurality of inlet flaps (7) adjacent to each other and operable reciprocately between an open position in which ingestion of ram air is allowed towards the interior of the turbomachine compartment (see arrows in FIG. 3), and a closed position (represented with dotted lines in FIG. 3) in which ram air ingestion is prevented. Preferably, the entire annular air intake (6) is covered by inlet flaps (7) that move simultaneously in such a way that in the open position ram air is ingested from all around the annular air intake (6).

As represented at the upper part of FIG. 3, the inlet flaps (7) are configured such in their open position that they are received inside the tailcone fuselage (2). In their closed position, an outer surface of the inlet flaps (7) is substantially flush with the tailcone fuselage (2) (see FIG. 5), such that the surface of tail cone fuselage (2) is continuous on the air intake area, and no drag is generated in that no element protrudes outside the fuselage.

Figure 4:
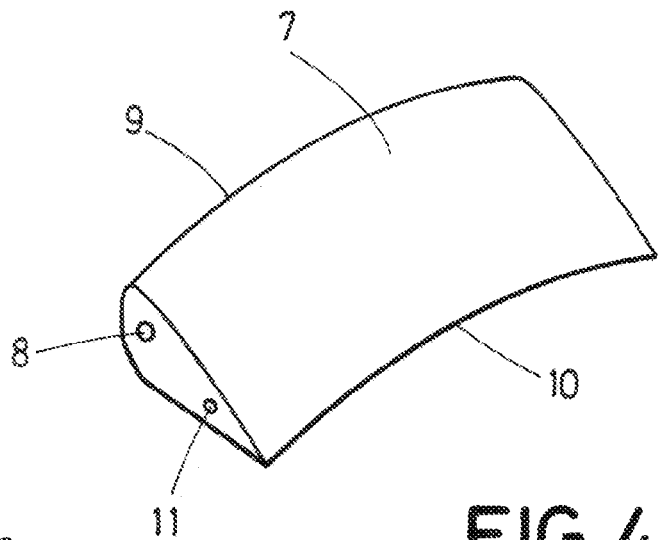
FIG. 4 shows a schematic representation of an inlet flap according to the invention.

As shown in FIG. 4, each inlet flap (7) is a curved body that has a leading edge (9) and a trailing edge (10) which is thinner than the leading edge (9). The curvature of each inlet flap (7) matches the curvature and shape of a particular section of the annular air intake (6). There is a pivot point (8) near the leading edge (9), and an actuation point (11) near the trailing edge (10). Each inlet flap (7) is fixed to the tailcone at the pivot point (8), and by actuating at the actuation point (11), the inlet flap (7) pivots about the pivot point (8) to move reciprocately from the open position to the closed position as represented in FIG. 5.

Figure 6:
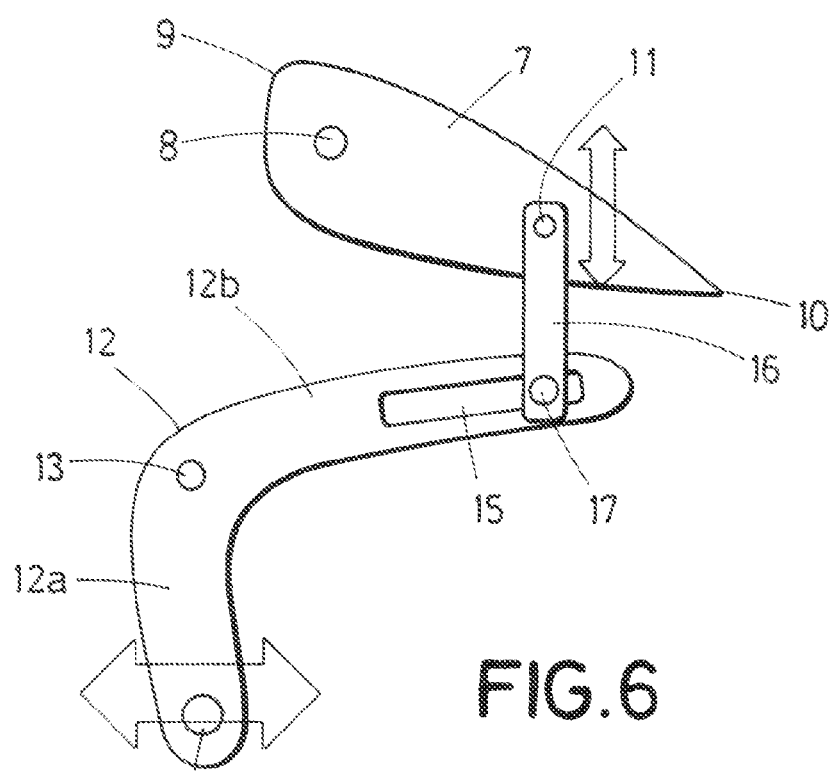
FIG. 6 shows an elevational view of the inlet flap actuator according to a preferred embodiment of the invention.
Figure 7:
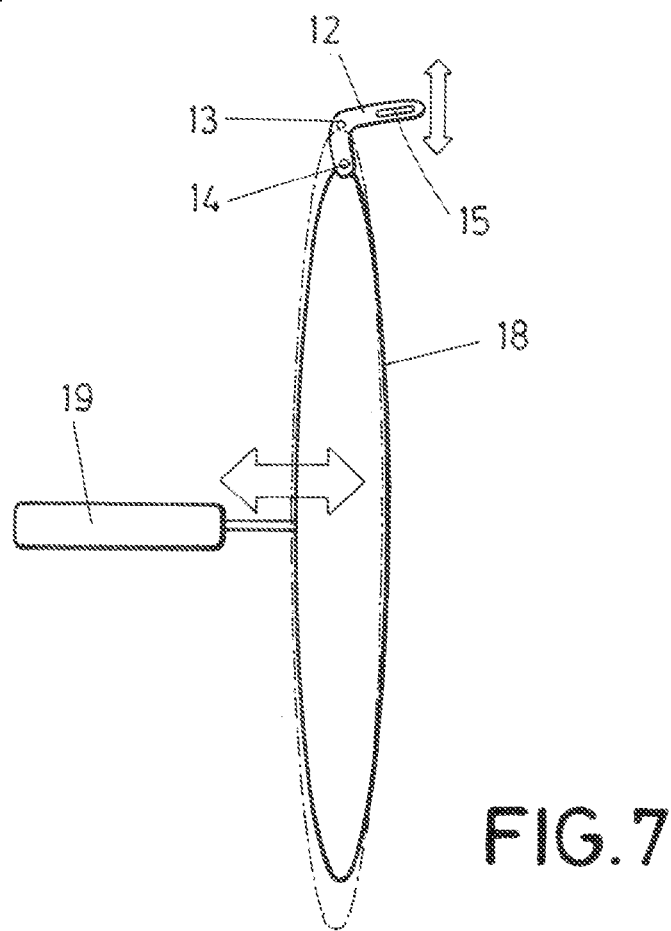
FIG. 7 shows a schematic representation of a flap actuator ring according to a preferred embodiment of the invention.

There are many possible ways to operate the inlet flaps (7). FIGS. 6 and 7 show an exemplary embodiment of an actuation mechanism, comprising a L-shaped lever (12) having first and second angled arms (12a,12b) with respect to a pivot point (13). The first arm (12a) has a point (14) which pivots relative to an actuation ring (18) (described below), and the second arm (12b) has a groove (15), such that a straight arm (16) has a first end (17) articulated at the groove (15) and a second end articulated with the actuation point (11) of the inlet flap (7).

Even though only one inlet flap (7) and only one actuation mechanism is represented in FIGS. 5 to 7 for the sake of the clarity of the figures, it is to be understood that in a practical embodiment, a plurality of inlet flaps (7) coupled with the respective actuation mechanisms, are installed all around the annular air intake (6).

The actuation ring (18) is placed vertically at the tailcone and adapted to move horizontally as illustrated in FIG. 7. The actuation ring (18) is inserted in the pivot point (14) of all the levers (12) so that by moving the actuation ring (18) forward (to the left in FIG. 7), all the levers (12) would move clockwise, thus causing the levers (12) to pivot relative to the actuation ring (18) at the pivot point (14) and the arms (16) would pull the inlet flaps (7) downwards to the open position. For moving the inlet flaps (7) to the closed position, the actuation ring (18) is moved backwards (to the right in FIG. 7) so that all the levers (12) would move counterclockwise, and the arms (16) would push all the inlet flaps (7) upwards to the closed position.

An actuator (19), for example a hydraulic or pneumatic cylinder, coupled with the actuation ring (18) is responsible for moving the actuation ring (18).

The above-described mechanism for operating (opening and closing) the annular air intakes, provides redundancy so that the system will be able to operate even if one or more of the individual actuators fails, thereby, enhancing the system reliability.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft tailcone comprising:
a tailcone fuselage,
a turbomachine compartment inside the tailcone fuselage,
a turbomachine housed inside the turbomachine compartment,
a ram air intake on the tailcone fuselage configured to cause ingestion of ram air towards the interior of the turbomachine compartment,
at least one inlet flap operable reciprocately from an open position in which ingestion of ram air is allowed, and a closed position in which ram air ingestion is prevented, and
an actuation mechanism configured to simultaneously move the at least one inlet flap from the open to the closed position,
wherein the ram air intake extends annularly along at least part of a perimeter of the tailcone fuselage,
wherein the inlet flap is configured such that in its open position, the inlet flap is located at least partially inside the tailcone fuselage, and in its closed position a surface of the inlet flap is substantially flush with a tailcone fuselage surface, and
wherein the actuation mechanism comprises an L-shaped lever having first and second angled arms with respect to a first pivot point, wherein the second arm has a groove, such that a straight arm has a first end mounted at the groove, and a second end is coupled with an actuation point of the inlet flap.

2. The aircraft tailcone according to claim 1, wherein the annular ram air intake extends annularly along an entire perimeter of the tailcone fuselage.

3. The aircraft tailcone according to claim 1, further comprising a plurality of inlet flaps adjacent to each other and covering the annular ram air intake in their closed position.

4. The aircraft tailcone according to claim 1, wherein each inlet flap is a curved body having a leading edge and a trailing edge which is thinner than the leading edge, and a pivot point near the leading edge so that the inlet flap pivots about the pivot point to move reciprocately from the open position to the closed position.

5. The aircraft tailcone according to claim 1, wherein the actuation mechanism further comprises a plurality of the L-shaped levers and an actuation ring placed vertically at the tailcone, and adapted to move horizontally, and wherein the actuation ring is inserted through a point on the first arm of all the levers to move all the levers simultaneously.

6. The aircraft tailcone according to claim 5, wherein the actuation mechanism is configured so that by moving the actuation ring forward towards a nose of the aircraft, all the levers move clockwise as viewed from a port side of the aircraft and the arms pull the inlet flap downwards to the open position, and by moving the actuation ring backwards towards a rear of the aircraft, all the levers move counter-clockwise as viewed from a port side of the aircraft and the arms push all the inlet flaps upwards to the closed position.

7. The aircraft tailcone according to claim 1, wherein the turbomachine is an Auxiliary Power Unit.

* * * * *